United States Patent [19]

Akase

[11] Patent Number: 5,307,671
[45] Date of Patent: May 3, 1994

[54] METHOD FOR DETECTING MISFIRES IN GASOLINE INTERNAL COMBUSTION ENGINE

[75] Inventor: Yoshiaki Akase, Hyogo, Japan

[73] Assignee: Mitsubishi Denki Kabushiki Kaisha, Tokyo, Japan

[21] Appl. No.: 842,962

[22] Filed: Feb. 28, 1992

[30] Foreign Application Priority Data

Mar. 4, 1991 [JP] Japan .................................. 3-37057
Mar. 4, 1991 [JP] Japan .................................. 3-37067

[51] Int. Cl.⁵ .......................................... G01M 15/00
[52] U.S. Cl. .................................................. 73/117.3
[58] Field of Search ................................ 73/117.3, 116; 364/431.07, 431.08; 123/419, 479, 436; 340/439

[56] References Cited

U.S. PATENT DOCUMENTS

| | | | |
|---|---|---|---|
| 5,041,980 | 8/1991 | Maddock et al. | 364/431.07 |
| 5,088,318 | 2/1992 | Osawa | 73/117.3 |
| 5,095,742 | 3/1992 | James | 73/116 |
| 5,105,657 | 4/1992 | Nakaniwa | 73/117.3 |

FOREIGN PATENT DOCUMENTS

58-19532  2/1983  Japan .
58-138271 8/1983  Japan .

*Primary Examiner*—Robert Raevis
*Attorney, Agent, or Firm*—Sughrue, Mion, Zinn, Macpeak & Seas

[57] ABSTRACT

In a method of detecting misfires in a gasoline internal combustion engine, the angular velocities of rotation of the engine detected by an angular velocity sensor are calculated over a period of time, and when the difference between the average value of the angular velocities of rotation and the maximum or minimum value thereof is equal to or larger than a predetermined threshold value, the occurrence of misfires is determined. The threshold value is changed according to the operating conditions of the engine such as engine speed or load. Thus, in the method, most suitable, threshold values are set over wide ranges spanning from low speed to high speed, and from light load to heavy load. The abnormal rotation of the engine due to misfires can thereby be with high accuracy.

8 Claims, 3 Drawing Sheets

13rad/sec$_{p-p}$

24rad/sec$_{p-p}$ (MISFIRES ARE DETECTED)

m TIMES $t_1$ (INITIATION OF MISFIRES)  $t_m$ (MISFIRES ARE DETECTED)

METHOD FOR DETECTING MISFIRES IN GASOLINE INTERNAL COMBUSTION ENGINE

BACKGROUND OF THE INVENTION

1. Field of the Invention

The present invention relates to a method of detecting misfires in a gasoline internal combustion engine (hereinafter referred to merely as "an engine", when applicable).

2. Related Art

A conventional misfire detecting method of this type, as disclosed by Japanese Patent Application (OPI) No. Sho. 58-138271 (the term "OPI" as used herein means an "unexamined published application"), employs an angular velocity sensor for detecting the angular velocity of rotation of an engine, an arithmetic circuit for calculating the period of the angular velocity of rotation detected by the rotational angular velocity sensor, and a determining circuit for determining whether or not the difference between the average value of the periods thus calculated and the peak value thereof is less than a predetermined value, to detect the troubles of the engine which are due to the occurrence of misfires in the engine, the unsuitable ignition timing, abnormal vibrations, etc.

As noted above, in the conventional misfire detecting method, it is determined that a misfire has occurred when the difference between the average value of the periods of the angular velocity of rotation of the engine, and the peak value thereof exceeds the predetermined value (which is constant irrespective of the conditions of the engine). In general, in case of high rotation or light load, the angular velocity of rotation of the engine is less variable. Hence, in order to detect a misfire in the case where the velocity of rotation is high or the load is light, the threshold value for decision should be low. On the other hand, in the case where the speed of rotation is low or the load is heavy, the angular velocity of rotation varies greatly even if there is no misfire occurring in the engine. Hence, if, in this case, the threshold value is low, then it may be determined that an abnormal condition has occurred although no abnormal condition is, in fact, involved at all. If, on the other hand, the threshold value is set to a high value, then when the speed of rotation is high or the load is light, the occurrence of misfires cannot be detected.

In general, in the conventional misfire detecting method, the occurrence of misfires is decided when a condition for deciding the occurrence of misfires (hereinafter referred to as "a misfire deciding condition", when applicable) is satisfied even only once. Hence, when the angular velocity of rotation of the engine is unstable, the misfire deciding condition is satisfied even if no abnormal condition is involved, resulting in a determination that a misfire has occurred. In addition, in the conventional method, it is impossible to decide the occurrence of a misfire depending on the operating conditions of the engine.

SUMMARY OF THE INVENTION

Accordingly, the present invention was made to eliminate the above-described difficulties accompanying the conventional misfire detecting method.

More specifically, an object of the invention is to provide a misfire detecting method for a gasoline internal combustion engine capable of positively detecting the abnormal rotation of the engine due to misfires, irrespective of the operating conditions of the engine.

In an example of a method of detecting misfires in a gasoline internal combustion engine according to the invention, the angular velocities of rotation of the engine detected by an angular velocity sensor are calculated over a given period, and when the difference between the average value of the angular velocities of rotation and the maximum or minimum value thereof is equal to or larger than a predetermined threshold value, the occurrence of misfires is determined, and the threshold value is changed according to the operating conditions of the engine such as rotational speed or load of the engine.

In another aspect of the invention, the occurrence of misfires in the engine is determined from the behavior of the angular velocity of rotation of the engine, and the number of times of satisfying a misfire deciding condition is changed according to the operating conditions of the engine.

In the method of the invention, as was described above, the threshold value for decision of the occurrence of misfires in the engine is changed according to the operating conditions of the engine. Hence, most suitable threshold values are set over the wide ranges spanning of from low speed to high speed, and from light load to heavy load.

Furthermore, in the method of the invention, the number of times of satisfying a misfire deciding condition is changed according to the operating conditions of the engine as was described above; that is, it is increased when it is difficult to decide the occurrence of misfires, and it is decreased when it is easy.

The nature, utility and principle of the invention will be more clearly understood from the following detailed description and the appended claims when read in conjunction with the accompanying drawings.

DESCRIPTION OF THE PREFERRED EMBODIMENT

Preferred embodiments of this invention will be described with reference to the accompanying drawings.

Figure 1:
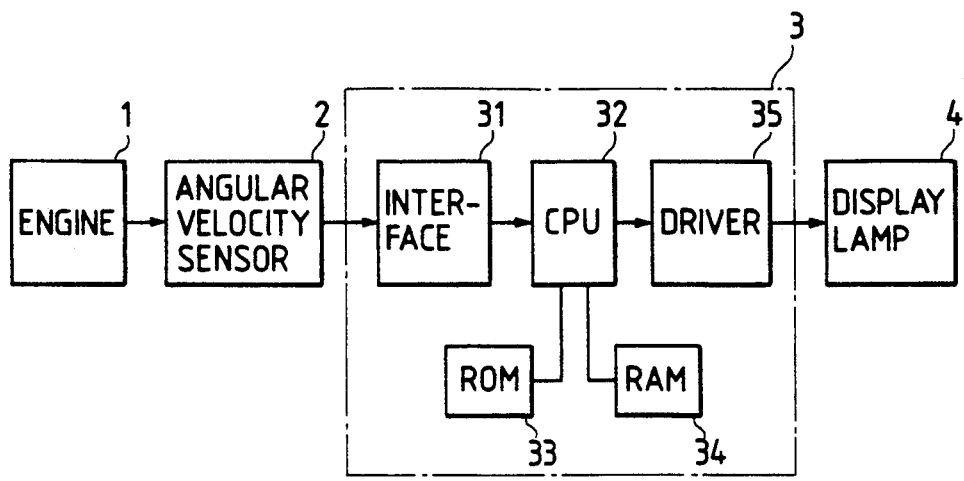
FIG. 1 is a block diagram for a description of an example of a misfire detecting method, which constitutes a first embodiment of this invention.

FIG. 1 is a block diagram for a description of an example of a misfire detecting method which constitutes a first embodiment of the invention and an example constituting a second embodiment of the invention. In FIG. 1, reference numeral 1 designates a gasoline internal combustion engine; 2, an angular-velocity-of-rotation sensor (hereinafter referred to as "an angular velocity sensor 2", when applicable) for detecting the angular velocity of rotation of the engine 1; and 3, a computer unit comprising an interface 31, a central processing unit (CPU) 32, a read only memory (ROM) 33, a random access memory (RAM) 34, and a driver 35. The computer unit 3 computes the angular velocity of rotation of the engine over a predetermined period of time, the angular velocity being detected by the angular velocity sensor 2. The difference between the average value of the angular velocities thus calculated and the maximum or minimum values thereof over the period is compared with a threshold value which has been determined from the operating conditions of the engine. When the difference is equal to or larger than the threshold value, it is decided that a misfire has occurred. The result of decision is applied through the driver 35 to a display lamp 4, so that it is displayed by the latter 4.

The misfire detecting method will be described by way of example using concrete numerical data.

Figure 2:
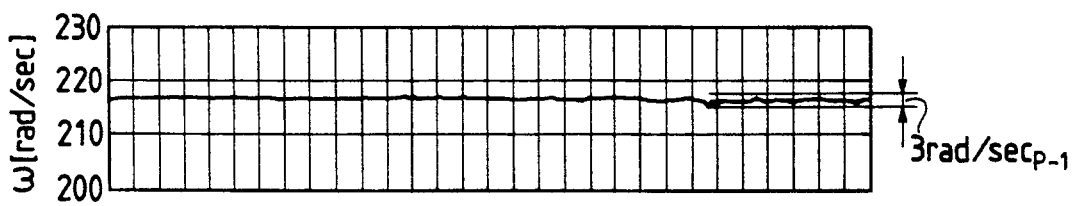
FIG. 2 is a diagram showing one example of the variation in the angular velocity of rotation of an engine which is in normal state.
Figure 3:
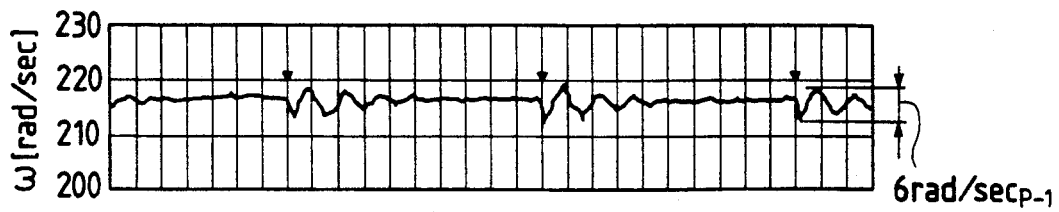
FIG. 3 is a diagram showing one example of the variation in the angular velocity of rotation of the engine in normal state as shown in FIG. 2 in which a misfire is caused to occur every ten revolutions of the engine.

FIG. 2 shows the variation in the angular velocity ($\omega$) of rotation of the engine with a speed (Ne) of 2000 rpm and a boost negative pressure (Pb) of $-400$ mmHg. FIG. 3 shows the variation in the angular velocity ($\omega$) of rotation of the engine in the case where a misfire occurs every ten revolutions of the engine with a velocity (Ne) of 2000 rpm and a boost negative pressure (Pb) of $-400$ mmHg.

Figure 4:
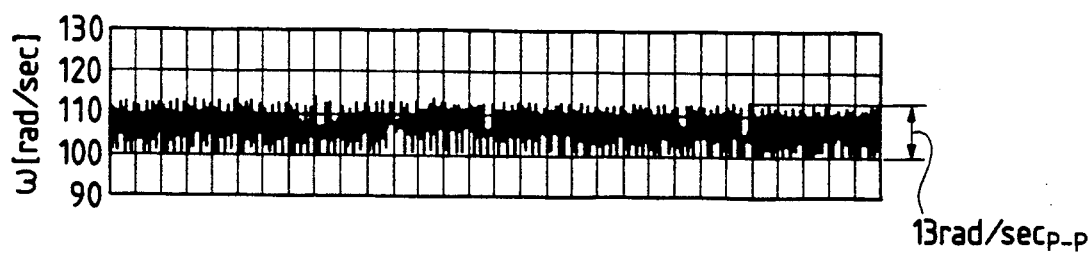
FIG. 4 is a diagram showing another example of the variation in the angular velocity of rotation of the engine which is in normal state.
Figure 5:
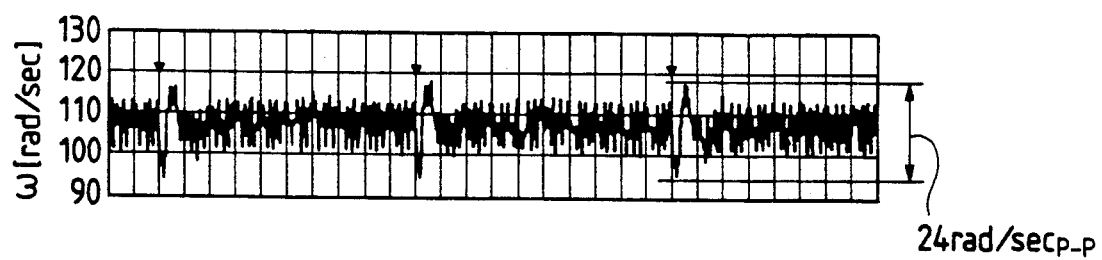
FIG. 5 is a diagram showing one example of the variation in the angular velocity of rotation of the engine in normal state in which a misfire is caused to occur every ten revolutions of the engine.
Figure 6:
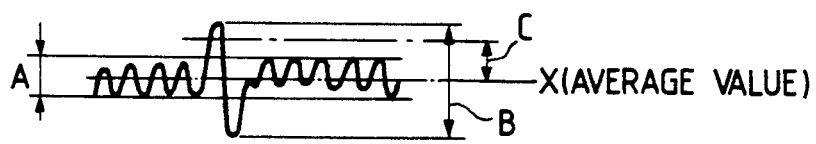
FIG. 6 is a diagram for a description of an equation for calculating a threshold value for decision of the occurrence of misfires.

FIG. 4 shows the variation in the angular velocity ($\omega$) of rotation of the engine with a speed (Ne) of 1000 rpm and a boost negative pressure (Pb) of WOT. FIG. 5 shows the variation in the angular velocity ($\omega$) of rotation of the engine in the case where a misfire occurs every ten revolutions of the engine with a speed (Ne) of 1000 rpm and a boost negative pressure (Pb) of WOT.

In the case of FIG. 3, at the occurrence of a misfire, the maximum deviation of the angular velocity of rotation of the engine is only 3 rad/sec. In the case of FIG. 4, the rotation is normal; however, the deviation is as much as 6.5 rad/sec. This means that the variation in the angular velocity of rotation of the engine depends on the operating conditions of the engine.

On the other hand, in the misfire detecting method of the invention, the differences average value and the peak values (maximum or minimum value) of the output signals outputted by the angular velocity sensor 2 over a given period are calculated by the CPU 32, and the differences thus calculated are compared with a threshold value C which has been determined from the speeds and loads of the engine. When the difference is larger than the threshold value C, it is determined that a misfire has occurred. Examples of the threshold value C are as listed in the following Table 1:

TABLE 1

| Pb Ne | 1000 rpm | 2000 rpm | 3000 rpm |
|---|---|---|---|
| $-400$ mm Hg | 5 | 2.25 | 2.75 |
| $-200$ mm Hg | 6.75 | 3.75 | 3.5 |
| WOT | 9.25 | 6 | 5 |

In Table 1, the threshold values C for determining the occurrence of a misfire are calculated from the following equation (1):

$$C=(A/2+B/2)/2 \tag{1}$$

where A represents the normal variation in angular velocity of rotation of the engine which is in normal condition, and B is the variation in the angular velocity of rotation of the engine in the case where a misfire occurs with the engine speed and the boost negative pressure being in steady state.

Thus, each threshold value is set between the variation in the angular velocity of rotation of the engine which is in normal condition, and that in the angular velocity of rotation of the engine which suffers from a misfire.

Table 2 indicates the amounts of variation (A) of the angular velocity of rotation of the engine which is in normal condition, and Table 3 indicates the amounts of variation (B) of the angular velocity of rotation of the engine when a misfire occurs with the engine speed and the boost negative pressure being in steady state. The data (A) and (B) are indicated in units of rad/sec.

TABLE 2

| Pb Ne | 1000 rpm | 2000 rpm | 3000 rpm |
|---|---|---|---|
| $-400$ mm Hg | 6 | 3 | 4 |
| $-200$ mm Hg | 9 | 3 | 5 |
| WOT | 13 | 6 | 8 |

TABLE 3

| Pb Ne | 1000 rpm | 2000 rpm | 3000 rpm |
|---|---|---|---|
| $-400$ mm Hg | 14 | 6 | 7 |
| $-200$ mm Hg | 18 | 12 | 9 |
| WOT | 24 | 18 | 12 |

As was described above, in the misfire detecting method of the invention, the angular velocities of rotation of the engine detected by the angular velocity sensor 2 are obtained over a predetermined period, and when the difference between the average value and the peak value thereof is equal to or larger than the threshold value C which has been determined from the speed (rpm) Ne and the degree of load Pb of the engine in advance, it is decided that a misfire has occurred. Hence, the abnormal rotation of the engine due to misfires can be positively detected.

Another example of the misfire detecting method, a second embodiment of the invention, will be described.

A block diagram for a description of the second embodiment is the same as FIG. 1 used for a description of the first embodiment. In the second embodiment, in the computer unit 3, the difference between the average value and the peak value of the signals outputted by the angular velocity sensor 2 over a given period is calculated by the CPU 32. The difference thus calculated is compared with the threshold value. When the difference is larger than the threshold value, it is determined that a misfire deciding condition has been satisfied. And, when the number of times of this determination reaches a value which has been predetermined according to the operating conditions of the engine, it is decided that a misfire has occurred. The result of decision is applied through the driver 35 to the display lamp 4, so that it is displayed by the latter 4.

Figure 7A:
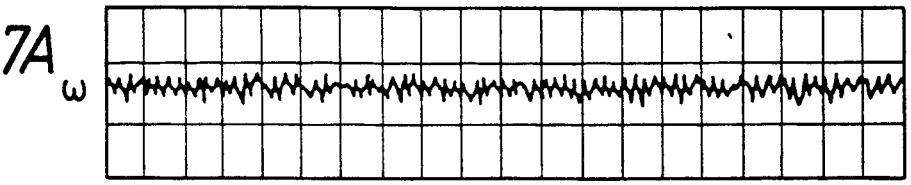
FIG. 7A is a diagram showing the behavior of the angular velocities of rotation of the engine which is normal in operating condition.
Figure 7B:
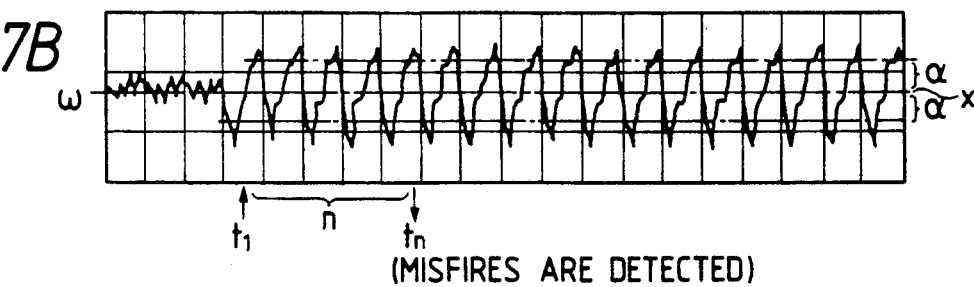
FIG. 7B is a diagram showing the behavior of the angular velocities of rotation of the engine which suffers from the continuous occurrence of misfires during operation.

The part (a) of FIG. 7 shows the behavior of the angular velocities of rotation ($\omega$) of the engine which is normal in operating condition, and the part (b) of FIG. 7 shows the behavior of the angular velocities of rotation ($\omega$) of the engine which suffers from the continuous occurrence of misfires. In the second embodiment, the occurrence of a misfire is decided from the behavior of the angular velocity of rotation of the engine. More specifically, the occurrence of a misfire is decided when, as shown in the part (b) of FIG. 7, the misfire deciding condition has been satisfied n times (or at the time instant ($t_n$)) since the time instant ($t_1$) that a misfire first occurred first. Hence, the misfire detecting method of the invention eliminates the difficulty accompanying the conventional method that, when the angular velocity of rotation of the engine is unstable, the misfire deciding condition is satisfied although the engine is normal in operation, with the result that the occurrence of a misfire is erroneously decided. Thus, misfires can be more positively detected by the misfire detecting method of the invention.

In the part (b) of FIG. 7, reference character x designates the average value of the detection signals provided by the angular velocity sensor 2 in a period, and $\alpha$, the threshold value for decision of the occurrence of a misfire. As for the number of times (n) of satisfying the misfire deciding condition, many values $n_1$ through $n_{16}$ are determined according to the operating conditions of the engine with the speeds (rpm) Ne and the degrees of load Pb of the engine as parameters, as shown in the following Table 4. When detected parameters come between those shown in Table 4, the smaller should be employed.

TABLE 4

| Pb Ne | 750 rpm | 1000 rpm | 3000 rpm | 5000 rpm |
|---|---|---|---|---|
| No load | $n_1$ | $n_2$ | $n_3$ | $n_4$ |
| −400 mm Hg | $n_5$ | $n_6$ | $n_7$ | $n_8$ |
| −200 mm Hg | $n_9$ | $n_{10}$ | $n_{11}$ | $n_{12}$ |
| WOT | $n_{13}$ | $n_{14}$ | $n_{15}$ | $n_{16}$ |

Figure 8A:
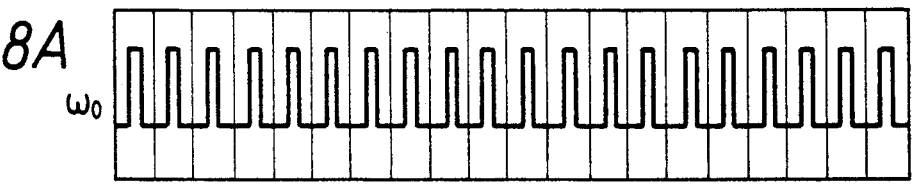
FIG. 8A is a diagram showing the behavior of the difference between the angular velocities of rotation detected at two detection intervals in a cycle of the engine which is in normal state.
Figure 8B:
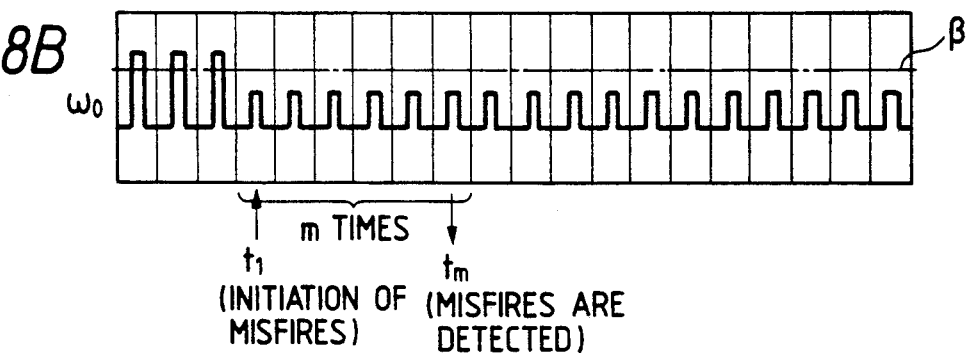
FIG. 8B is a diagram showing the behavior of the difference between the angular velocities of rotation detected at two detection intervals in a cycle of the engine in which misfires occur continuously during operation.

FIG. 8 is a diagram for a description of a third embodiment of the invention. More specifically, the part (a) of FIG. 8 shows the behavior of the difference $\omega_0$ between the angular velocities of rotation detected at two detection intervals in a cycle of the engine which is in a normal state, and the part (b) of FIG. 8 shows the behavior of the difference $\omega_0$ between the angular velocities of rotation detected at two detection intervals in a cycle of the engine in which misfires occur continuously during operation. As shown in the part (b) of FIG. 8, when the difference $\omega_0$ between the angular velocities of rotation at two detection points in a cycle of the engine is lower than a predetermined threshold value $\beta$, used for decision of detecting the misfires, a misfire deciding condition is satisfied. Similarly as in the case of the above-described embodiment, when the number of times (m) of satisfying the misfire deciding condition reaches a value which is determined according to the operating conditions of the engine (the time instant ($t_m$)), it is decided that a misfire has occurred.

As for the number of times (m) of satisfying the misfire deciding condition, many values $m_1$ through $m_{16}$ are determined according to the operating conditions of the engine with the speeds (rpm) Ne and the degrees of load Pb of the engine as parameters, as shown in the following Table 5. When detected parameters come between those shown in Table 4, the smaller should be employed.

TABLE 5

| Pb Ne | 750 rpm | 1000 rpm | 3000 rpm | 5000 rpm |
|---|---|---|---|---|
| No load | $m_1$ | $m_2$ | $m_3$ | $m_4$ |
| −400 mm Hg | $m_5$ | $m_6$ | $m_7$ | $m_8$ |
| −200 mm Hg | $m_9$ | $m_{10}$ | $m_{11}$ | $m_{12}$ |
| WOT | $m_{13}$ | $m_{14}$ | $m_{15}$ | $m_{16}$ |

As was described above, in the misfire detecting method of the invention, the threshold value for decision of the occurrence of a misfire in a gasoline internal combustion engine is changed according to the operating conditions of the engine such as engine speed and load; that is, most suitable threshold values can be set for decision of the occurrence of misfires over the wide ranges of from low speed to high speed, and from light load to heavy load. Thus, with the method, the abnormal rotation of the engine due to misfires can be detected with high accuracy.

If summarized, in the misfire detecting method of the invention, the number of times of satisfying the misfire detecting condition is changed according to the operating conditions of the engine; that is, it is increased when the operating conditions are such that it is difficult to decide the occurrence of misfires, whereas it is decreased when the operating conditions are such that it is easy to decide the occurrence of misfires. Thus, with the method of the invention, misfires can be positively detected under all the operating conditions of the engine.

While there has been described in connection with the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A method of detecting misfires in a gasoline internal combustion engine that operates under various operating conditions, comprising the steps of:

varying a threshold value, used for determining occurrences of misfires in the engine, in accordance with the operating conditions of the engine; and detecting misfires in the engine by comparing an angular velocity of rotation of the engine with the threshold value; wherein the threshold value is calculated according to the following equation:

$$C=(A/2+B/2)/2$$

wherein A represents a normal variation in angular velocity of the engine operating normally, B represents a variation in angular velocity of the engine when misfiring, and C represents the threshold value.

2. A method as claimed in claim 1, wherein the threshold value is varied according to an engine load and a number of revolutions per unit time of the engine.

3. A method of detecting misfires in a gasoline internal combustion engine, comprising the steps of:
- detecting an angular velocity of rotation of the engine with an angular velocity sensor;
- calculating the angular velocity of rotation thus detected;
- setting a threshold value which varies in accordance with operating conditions of the engine; and
- detecting an occurrence of a misfire when a difference between an average value of the angular velocity of rotation thus calculated and a peak value thereof is at least equal to the threshold value;
- wherein the threshold value is calculated according to the following equation:

$$C = (A/2 + B/2)/2$$

wherein A represents a normal variation in angular velocity of the engine operating normally, B represents a variation in angular velocity of the engine when misfiring, and C represents the threshold value.

4. A method according to claim 3, wherein the threshold value varies as a function of engine speed.

5. A method according to claim 4, wherein the threshold value varies as a function of engine load.

6. A method according to claim 3, wherein the peak value is a local maximum value of angular velocity.

7. A method according to claim 6, wherein the peak value is a local minimum value of angular velocity.

8. A method of detecting misfires in a gasoline internal combustion engine, comprising the steps of:
- detecting an angular velocity of rotation of the engine with an angular velocity sensor;
- calculating the angular velocity of rotation thus detected;
- setting a threshold value;
- registering a misfire instance whenever a difference between an average value of the angular velocity of rotation thus calculated and a peak value thereof is at least equal to the threshold value;
- counting the misfire instances occurring over a given period of time; and
- comparing the misfire instances counted with a threshold number which varies in accordance with operating conditions of the engine;
- wherein the threshold value is calculated according to the following equation:

$$C = (A/2 + B/2)/2$$

wherein A represents a normal variation in angular velocity of the engine operating normally, B represents a variation in angular velocity of the engine when misfiring, and C represents the threshold value.

* * * * *